US008317435B2

(12) United States Patent
Heinloth et al.

(10) Patent No.: US 8,317,435 B2
(45) Date of Patent: Nov. 27, 2012

(54) CUTTING INSERT

(75) Inventors: Markus Heinloth, Postbauer-Heng (DE); Jürgen Bär, Fürth (DE); Martin Hausmann, Ratingen (DE); Carsten Schwaner, Mülheim/Ruhr (DE)

(73) Assignee: Kennametal Widia Produktions GmbH & Co., KG, Essen (DE)

( * ) Notice: Subject to any disclaimer, the term of this patent is extended or adjusted under 35 U.S.C. 154(b) by 273 days.

(21) Appl. No.: 11/920,530

(22) PCT Filed: Apr. 4, 2006

(86) PCT No.: PCT/DE2006/000597
§ 371 (c)(1),
(2), (4) Date: Nov. 15, 2007

(87) PCT Pub. No.: WO2006/128411
PCT Pub. Date: Dec. 7, 2006

(65) Prior Publication Data
US 2009/0123242 A1   May 14, 2009

(30) Foreign Application Priority Data

Jun. 2, 2005  (DE) .......................... 10 2005 025 818
Aug. 4, 2005  (DE) .......................... 10 2005 037 310

(51) Int. Cl.
*B23P 15/34*   (2006.01)
(52) U.S. Cl. ........................................ 407/113; 407/114
(58) Field of Classification Search .................... 407/60, 407/61, 113, 114, 115, 116
See application file for complete search history.

(56) References Cited

U.S. PATENT DOCUMENTS

| 4,111,589 | A  | * | 9/1978  | Goeke          | 407/114 |
| 4,585,375 | A  | * | 4/1986  | Erkfritz       | 407/114 |
| 5,052,863 | A  | * | 10/1991 | Satran         | 407/113 |
| 5,158,401 | A  | * | 10/1992 | Pawlik         | 407/40  |
| 5,454,671 | A  | * | 10/1995 | Qvarth         | 407/42  |
| 5,586,843 | A  | * | 12/1996 | Minicozzi      | 407/42  |
| 5,807,031 | A  | * | 9/1998  | Arai et al.    | 407/113 |
| 5,957,629 | A  | * | 9/1999  | Hessman et al. | 407/113 |
| 6,109,838 | A  | * | 8/2000  | Riviere        | 407/36  |
| 6,227,772 | B1 | * | 5/2001  | Heinloth et al.| 407/113 |
| 6,503,028 | B1 | * | 1/2003  | Wallstrom      | 407/35  |
| 6,632,051 | B1 | * | 10/2003 | Wermeister     | 407/114 |
| 6,733,215 | B2 | * | 5/2004  | Isaksson       | 407/114 |
| 6,764,254 | B2 | * | 7/2004  | Emoto et al.   | 407/34  |

(Continued)

FOREIGN PATENT DOCUMENTS

JP         01310808  A  *  12/1989
(Continued)

*Primary Examiner* — Kenneth E. Peterson
*Assistant Examiner* — Jennifer Swinney
(74) *Attorney, Agent, or Firm* — Larry R. Meenan, Esq.

(57) ABSTRACT

The invention relates to a cutting insert for clamping into a disc-type or strip-shaped tool body, in particular, for milling crankshafts, whereby the insert is substantially cuboid-shaped and has two front faces, two side faces, serving as cutting faces as well as an upper and a lower side face, whereby a convex face is arranged between the front faces and the upper and lower side faces, so that the upper and lower side faces and the convex face form cutting edges each with a side face. According to invention, the cutting insert has an inwardly-tapered face adjoining the convex face, which allows the cutting edge to protrude and tapered chamfers are provided between the inwardly-tapered faces of the front face on both sides of a planar supporting surface to the outer edge.

12 Claims, 3 Drawing Sheets

U.S. PATENT DOCUMENTS

| | | | |
|---|---|---|---|
| 6,939,091 B2 * | 9/2005 | Wermeister | 407/113 |
| 7,097,393 B2 * | 8/2006 | Satran et al. | 407/113 |
| 7,101,121 B2 * | 9/2006 | Wermeister et al. | 407/113 |
| 7,275,895 B2 * | 10/2007 | Heinloth | 407/113 |
| 7,306,409 B2 * | 12/2007 | Stabel et al. | 407/113 |
| D588,616 S * | 3/2009 | Tanaka et al. | D15/139 |
| 7,549,825 B2 * | 6/2009 | Wermeister | 407/113 |
| 7,553,112 B1 * | 6/2009 | Hecht et al. | 407/113 |
| 2003/0063954 A1 | 4/2003 | Nerlich et al. | |

FOREIGN PATENT DOCUMENTS

| | | |
|---|---|---|
| JP | 2000-024824 | 1/2000 |
| JP | 2002187006 A * | 7/2002 |
| JP | 2004-042254 | 12/2004 |

\* cited by examiner

SECTION E-E

DETAIL B

CUTTING INSERT

CROSS REFERENCE TO RELATED APPLICATIONS

This application is the US national phase of PCT application PCT/DE2006/000597, filed 4 Apr. 2006, published 7 Dec. 2006 as WO2006/128411, and claiming the priority of German patent application 102005025818.2 itself filed 2 Jun. 2005 and German patent application 102005037310.0 itself filed 4 Aug. 2005, whose entire disclosures are herewith incorporated by reference.

FIELD OF THE INVENTION

The invention relates to a cutting insert for clamping on a tool body shaped as a disk or bar, in particular for milling crankshafts, which is substantially parallelepipedal and has two front faces whose spacing defines the width of the cutting insert, two side faces that act as cutting surfaces and whose spacing determines the thickness of the cutting insert, and one upper and one lower end face, whereby one convex edge surface is arranged between each of the front faces and the upper end face and lower end face, such that the upper and lower end faces and the convex edge surfaces each form with a side face a cutting edge that terminates laterally in cutting corners. Such cutting inserts are known for instance from DE 197 04 931 C1 (U.S. Pat. No. 6,227,772).

BACKGROUND OF THE INVENTION

When machining the journal of a crankshaft, in order to be able to cut a 90° corner, this journal must first be machined with a first cutting plate before the cylinder surface is then machined by means of a so-called diameter plate. Productivity is relatively low if two different indexable inserts, each with four cutting edges, are used for these machining processes.

U.S. Pat. No. 6,227,772 describes a cutting insert having a largely parallelepipedal base body that is fitted as an indexable insert with eight usable cutting plates. This cutting insert has two planes arranged parallel to one another and larger surfaces through which pass a fastening hole and four side faces adjacent thereto, specifically two small end faces that are parallel to one another and larger longitudinal faces that each have, in the center approximately along their longitudinal axis, a projecting bar that acts as a support surface when clamping the cutting insert into a tool holder. The larger surfaces merge via a rounded edge into smaller edge surfaces so that on the longitudinal side approximately quarter circle-shaped cutting edges result as limit lines to the edge surfaces in the corner area. The long cutting edges as limit lines as [sic] between the larger surfaces and each adjacent longitudinal surface are arcuately curved so that a body results that is mirror-symmetrical to the longitudinal center plane and to the transverse center plane. With each of their ends and the rounded edge, the long cutting edges form an angle between 70° and 80° between the small edge surface and the larger surface. Despite these eight cutting edges, it is not possible to cut 90° corners with such a cutting insert because the secondary cutting edges would re-cut the cheeks of the 90° corner. Thus the use of these cutting plates is also limited to the use of four cutting edges.

OBJECT OF THE INVENTION

It is the object of the present invention to create an indexable insert for machining a 90° corner that is suitable for performing all of the cutting operations required therefor, and that simultaneously has the greatest possible number of effective cutting edges.

SUMMARY OF THE INVENTION

This object is attained using the cutting insert where an inwardly angled surface adjoins the convex edge surface, allowing the cutting corner to project. Furthermore, bevel faces angled to the outer edge are provided between the inwardly angled surfaces on the front face on both sides of a planar support surface. The width and the thickness of the cutting insert vary from each other by no more than 20%, and they preferably are identical in length. What is attained using the above-described measures is that the secondary cutting edges of the inventive cutting inserts are exposed so that they cannot re-cut a cheek of a crankshaft. Since because its thickness is approximately the same as its depth the defined cutting insert can be used both for machining a 90° corner and also for machining the outer pin diameter of a crankshaft, the inventive cutting insert replaces the two types of indexable inserts normally used. This minimizes both the tool inventory costs and the manufacturing costs for the cutting inserts and due to the greater number of usable cuts leads to lower production costs.

Thus in accordance with one further development of the invention the mounting bolt that in the clamped condition passes through a bore that is perpendicular to the front faces should be shorter than the cutting edge length. This measure prevents excessive elongation of the mounting bolt.

Between the two above-described chamfers the front face preferably has a flat support surface, the support surfaces of the two spaced-apart front faces being exactly parallel to one another.

In one specific embodiment of the present invention, the slopes of the angled surfaces are 1° to 10° relative to the respective support surface, preferably 5°. The slope of the bevel faces to the planes of the respective support surface is between 15° and 30°, preferably 25°.

In order to create a secure support, the support surfaces are made planar on the respective front faces and flank the bore for receiving the mounting bolt. The support surfaces and the lines that lie on the convex edge surfaces and project therefrom extend coplanar with the plane of the support faces.

The cutting angle along the cutting edge is preferably selected to be positive and is up to 20°, in particular 10° to 15°. For stabilizing the cutting edge, a chamfer that is preferably set at a chamfer angle of 0° to −15° can also be provided along the cutting edge. In accordance with one embodiment of the invention, the radius of curvature for the convex edge surfaces is between 1 mm and 1.5 mm, and is preferably 1.2 mm.

BACKGROUND OF THE INVENTION

Additional embodiments and advantages of the cutting insert result from the drawings.

SPECIFIC DESCRIPTION

Figure 1:
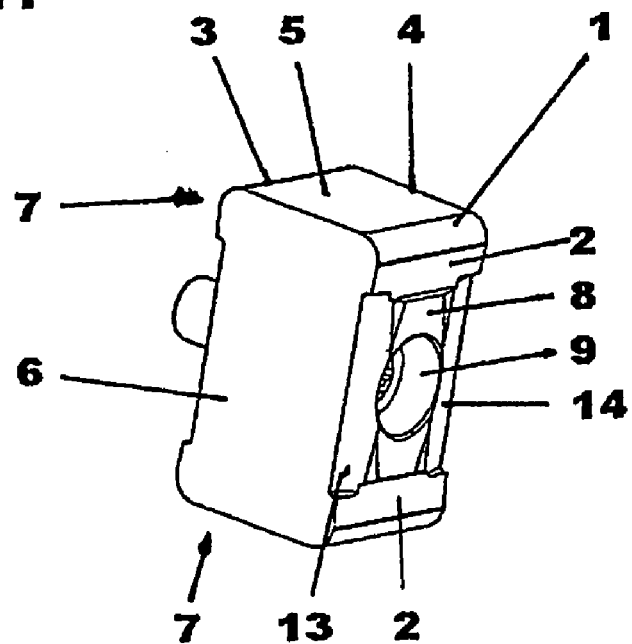
FIGS. 1 and 2 show different views of a first embodiment of an inventive cutting insert.

The parallelepipedal cutting insert has opposite front faces 10 and 11 that merge at the top and bottom via convex edge surfaces 1 into upper and lower end faces 5. The cutting surfaces are formed by side faces 6 that connect the front faces 10 and 11 to one another. These side faces 6 are bounded by cutting edges 7 formed by the upper and lower faces 5 and the convex edge surfaces 1 that extend over an angle of 90° in the corner area 7' and have an inwardly inclined secondary cutting edge that is formed by an angled surface 2 connected to the edge surface 1. This surface 2 extends across the entire width 3 of the cutting insert and causes the secondary cutting edge to be exposed so that this secondary cutting edge cannot re-cut when the cutting tool is dipped into the workpiece at a right angle. The two front faces 10 and 11 furthermore each have two planar support surfaces 8 that are parallel to each other. A fastening hole 9 in which a mounting bolt 12 is received is formed in the support surfaces. Bevel faces 13 and 14 are provided on both sides of the flat support surfaces 8 and between the angled surfaces 2 (above and below). A width 4 and a thickness 3 of this cutting insert are nearly identical. The mounting bolt 12 should be no longer than the straight-line part of the cutting edge 7 in order to prevent excess elongation of the bolt. The cutting insert is installed in the tool holder such that it engaged the workpiece at an angle of exactly 90° and cuts a corner that is exactly 90°. The cutting insert can preferably be employed for crankshaft machining anywhere that the oil bond is so high that the opposing cutting edge does not also cut or is not exposed.

Figure 2:
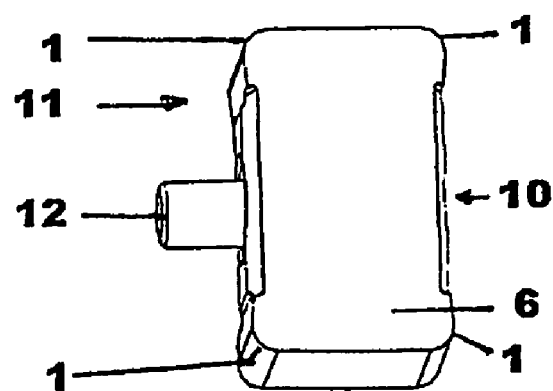
Figure 3:
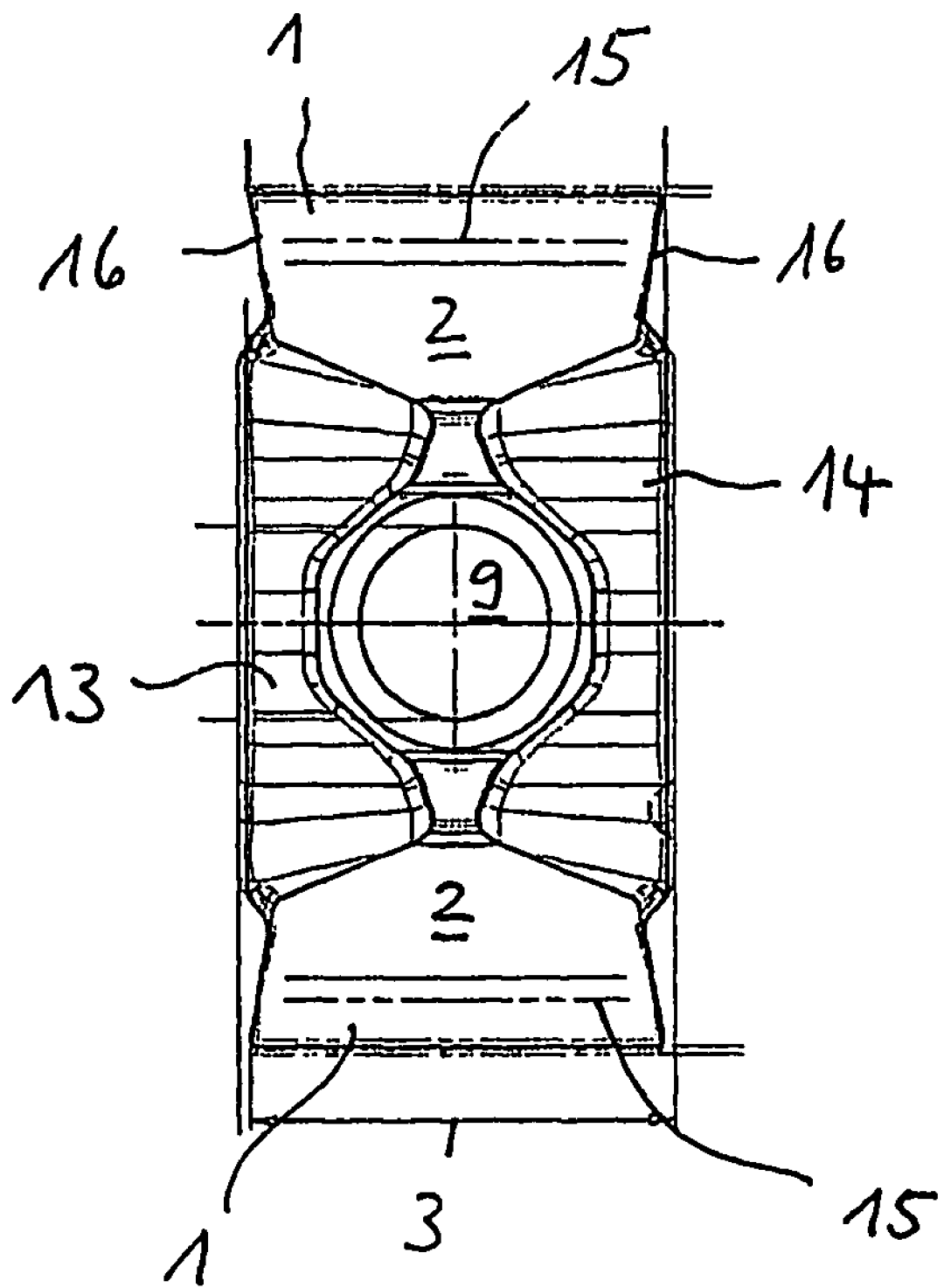
FIG. 3 is a top view onto the front face of another embodiment of the cutting insert.
Figure 6:
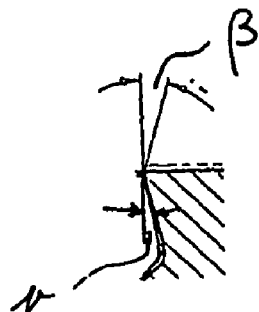
FIG. 6 is a sectional depiction E-E in accordance with FIG. 4.
Figure 5:
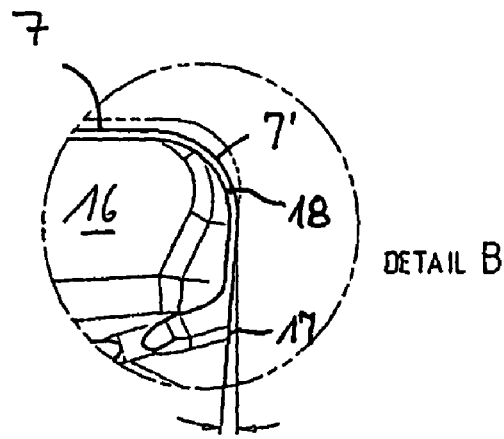
FIG. 5 is a detail B in accordance with FIG. 4.
Figure 4:
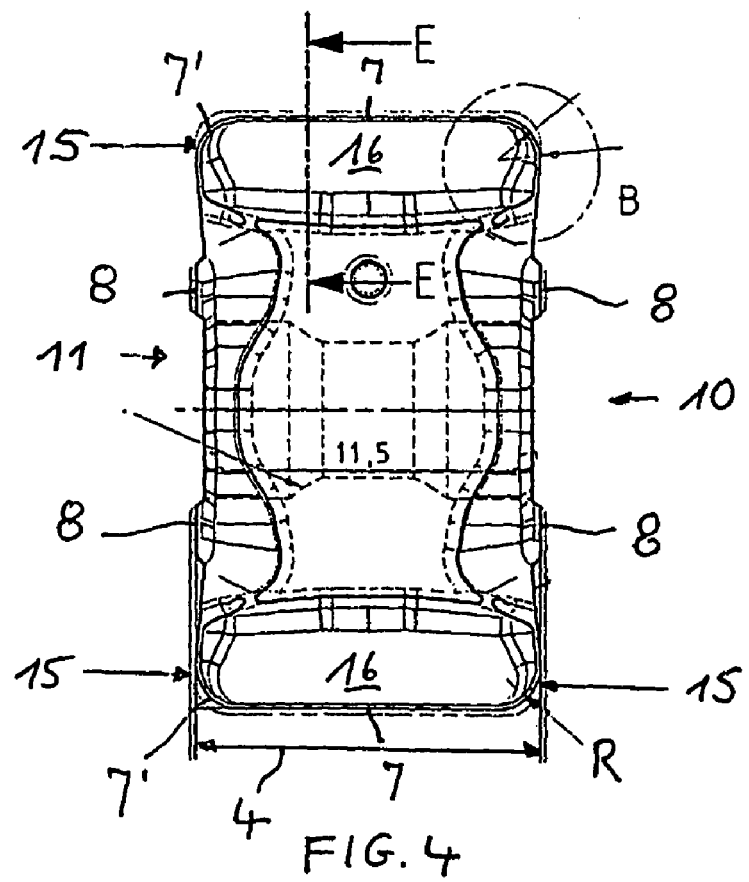
FIG. 4 is a top view onto a side face of the cutting insert in accordance with FIG. 3.

In another embodiment of the invention in accordance with FIGS. 3 and 4, identical parts are provided with the same reference numbers as for the cutting insert in accordance with FIGS. 1 and 2. The cutting insert shown in FIGS. 3 through 6 is also largely parallelepipedal, the width 4 of the cutting insert seen in FIG. 4, which is largely determined by the distance between the cutting edge corners 7', being about 20% greater than the thickness 3 of the cutting insert. Adjacent each end of the fastening hole 9, above and below, are two small support surfaces 8 that are somewhat trapezoidal as shown in FIG. 3 that are coplanar as shown by lines 15 in FIG. 4. As can be seen from FIG. 4, the line 15, which approximately forms the transition of the angled surface 2 to the curved surface 1, forms with the surfaces 8 a secure support in a single plane. As can be seen from FIG. 5, the angle α by which the secondary cutting edge 17 is inwardly inclined relative to a vertical to the cutting edge 7 is 5°. A chamfer 18 extends along the cutting edge at an angle β of (−)15° (see FIG. 6). The cutting angle γ is 12° to 15°.

The surfaces 16 can be provided with chip-shaping elements, the known shapes according to the prior art, in the form of elevations or depressions, being used. The chip-shaping elements should in particular serve for removing the chip and for chip breaking.

The inventive cutting insert can comprise a hard metal or a cermet body that is uncoated or that is provided with a single- or multi-layer coating. The material selected for the cutting insert and for the coating is largely a function of the material to be cut, which can be a non-ferrous metal, iron, or a casting material, e.g. a crankshaft. Moreover, the material selection is determined by the method parameters, where for milling crankshafts, which can be done both as inside milling and as outside milling, preferably high cutting speeds of more than 160 m/min to 300 m/min are attained.

The invention claimed is:

1. A cutting insert, comprising:
   a pair of generally parallel, opposite front faces;
   a pair of side faces connecting the front faces to one another;
   a pair of end faces connecting the side faces and the front faces to each other; and
   a plurality of convex edge surfaces, each convex edge surface merging with a respective front face and a respective end face; and
   a cutting edge formed at an intersection between each convex edge surface and each side face,
   wherein each of the front faces includes a pair of angled surfaces extending between the side faces across an entire width of the cutting insert, each angled surface extending inward from a respective convex edge surface towards each other, and wherein each of the front faces further includes a pair of bevel faces extending along a respective side face and connecting the pair of angled surfaces to each other, and wherein each of the front faces further includes a pair of planar support surfaces extending between the pair of angled surfaces, the pair of bevel faces and a fastening hole of the cutting insert.

2. The cutting insert according to claim 1, wherein a thickness of the cutting insert is approximately equal to the width of the cutting insert.

3. The cutting insert according to claim 1, wherein each convex edge surface has an arc length angle of greater than 90°.

4. The cutting insert according to claim 1, wherein the pair of planar support surfaces are substantially parallel to each other.

5. The cutting insert according to claim 1, further comprising a mounting bolt at least partially received in the fastening hole of the cutting insert and having a length less than the width of the cutting insert.

6. The cutting insert according to claim 1, wherein a slope of each of the pair of angled surfaces is 1° to 10° relative to the planar support surfaces.

7. The cutting insert according to claim 1, wherein each cutting edge is formed with a respective chamfer set at a chamber angle of 0° to −15°.

8. The cutting insert according to claim 1, wherein each convex edge surface has a radius of curvature between 1 mm to 1.5 mm.

9. The cutting insert according to claim 1, wherein each cutting edge is formed with a chamfer having an angle of between 0° to −15°.

10. The cutting insert according to claim 1, wherein a cutting angle along each of the cutting edges is positive and at most 20°.

11. The cutting insert according to claim 1, further comprising a secondary cutting edge formed at an intersection between each convex edge surface and side face and inclined at an angle with respect to the cutting edge.

12. The cutting insert according to claim 11, wherein the angle is 5°.

* * * * *

UNITED STATES PATENT AND TRADEMARK OFFICE
CERTIFICATE OF CORRECTION

| | | |
|---|---|---|
| PATENT NO. | : 8,317,435 B2 | Page 1 of 1 |
| APPLICATION NO. | : 11/920530 | |
| DATED | : November 27, 2012 | |
| INVENTOR(S) | : Markus Heinloth et al. | |

It is certified that error appears in the above-identified patent and that said Letters Patent is hereby corrected as shown below:

On the Title Page, item (57), under "ABSTRACT", in Column 2, Line 9, delete "to" and insert -- to the --, therefor.

In Column 4, Line 43, in Claim 7, delete "chamber" and insert -- chamfer --, therefor.

Signed and Sealed this
Second Day of April, 2013

Teresa Stanek Rea
*Acting Director of the United States Patent and Trademark Office*